United States Patent
DeJong et al.

(10) Patent No.: US 10,913,403 B2
(45) Date of Patent: Feb. 9, 2021

(54) GLASS AND EXTERIOR PANEL DESIGN FOR LOW NOISE TRANSMISSION

(71) Applicant: Toyota Motor Engineering & Manufacturing North America, Inc., Plano, TX (US)

(72) Inventors: Richard G. DeJong, Grand Rapids, MI (US); Steven R. Sorenson, Ypsilanti, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 98 days.

(21) Appl. No.: 16/356,154

(22) Filed: Mar. 18, 2019

(65) Prior Publication Data

US 2020/0298772 A1 Sep. 24, 2020

(51) Int. Cl.
*B60R 13/08* (2006.01)
*B32B 17/10* (2006.01)

(52) U.S. Cl.
CPC .... *B60R 13/0815* (2013.01); *B32B 17/10036* (2013.01); *B32B 17/1055* (2013.01); *B32B 17/10871* (2013.01); *B32B 2307/102* (2013.01); *B32B 2605/006* (2013.01)

(58) Field of Classification Search
None
See application file for complete search history.

(56) References Cited

U.S. PATENT DOCUMENTS

| 5,796,055 | A | * | 8/1998 | Benson, Jr. | B32B 17/10 181/208 |
| 7,694,460 | B2 | | 4/2010 | Tao et al. | |
| 7,968,186 | B2 | * | 6/2011 | Rymer | B32B 17/10 428/339 |
| 8,474,198 | B2 | | 7/2013 | Neple et al. | |

(Continued)

OTHER PUBLICATIONS

"Saflex® Acoustic PVB Interlayer," Marketing Materials from Saflex (www.saflex.com/acoustic), 2 pages (2018).

(Continued)

*Primary Examiner* — Lori L Lyjak
(74) *Attorney, Agent, or Firm* — Christopher G. Darrow; Darrow Mustafa PC

(57) ABSTRACT

A noise insulating support panel is provided for a structural assembly and includes a base substrate component and at least one localized stiffening reinforcement feature. The reinforcement feature generally extends across the base substrate component in a length direction aligned with, i.e., substantially parallel to, or substantially perpendicular to, a direction of airflow exhibiting turbulent pressure onto the base substrate component. The reinforcement feature cooperates with the base substrate component to minimize energy transmission through the base substrate component. If the base substrate component is a body panel, the reinforcement feature may be a stiffening rib member; if laminated glass, the reinforcement feature is located within an interlayer disposed between glass layers. The interlayer may include a first region including polyvinyl butyral having a first stiffness, and a second region including polyvinyl butyral having (Continued)

a second, lower stiffness. The reinforcement feature may also be an edge stiffening treatment.

19 Claims, 6 Drawing Sheets

(56) References Cited

U.S. PATENT DOCUMENTS

| | | | | |
|---|---|---|---|---|
| 2001/0046595 A1* | 11/2001 | Moran | ................... | B32B 17/10 |
| | | | | 428/212 |
| 2003/0168888 A1* | 9/2003 | Decker | ............... | B60R 13/0853 |
| | | | | 296/198 |
| 2015/0064374 A1* | 3/2015 | Jain | ................. | B32B 17/10137 |
| | | | | 428/34 |
| 2015/0140301 A1* | 5/2015 | Fisher | ............... | B32B 17/10743 |
| | | | | 428/215 |
| 2015/0202846 A1* | 7/2015 | Byker | .................... | B32B 27/30 |
| | | | | 428/141 |
| 2015/0306848 A1* | 10/2015 | Anderson | ............... | B32B 27/36 |
| | | | | 428/141 |
| 2016/0154153 A1* | 6/2016 | Tsunoda | ................. | C08K 5/098 |
| | | | | 359/360 |
| 2016/0159043 A1* | 6/2016 | Karagiannis | ...... | B32B 17/10761 |
| | | | | 428/220 |
| 2016/0160031 A1* | 6/2016 | Karagiannis | ............ | B32B 27/42 |
| | | | | 428/437 |
| 2016/0250982 A1 | 9/2016 | Fisher et al. | | |
| 2017/0341345 A1* | 11/2017 | Loccufier | .............. | B32B 37/025 |
| 2018/0029341 A1 | 2/2018 | Lu et al. | | |
| 2018/0082669 A1* | 3/2018 | Lu | ..................... | B32B 17/10761 |
| 2018/0194112 A1 | 7/2018 | Ajdari et al. | | |
| 2018/0194114 A1* | 7/2018 | Mannheim Astete | ....................... | |
| | | | | H01L 31/02008 |
| 2018/0194120 A1 | 7/2018 | Lu et al. | | |
| 2018/0237326 A1* | 8/2018 | Fredholm | ......... | B32B 17/10761 |
| | | | | 428/220 |
| 2018/0272662 A1 | 9/2018 | Lu | | |
| 2018/0281354 A1 | 10/2018 | Lu et al. | | |
| 2018/0281355 A1 | 10/2018 | Cleary et al. | | |
| 2018/0290436 A1* | 10/2018 | Yui | ........................ | B32B 27/36 |
| | | | | 428/141 |
| 2018/0297331 A1* | 10/2018 | Gahagan | ............... | C03B 27/016 |
| 2019/0002330 A1* | 1/2019 | Lezzi | .................... | C03B 27/016 |
| 2019/0378943 A1* | 12/2019 | Krajewski | ......... | H01L 31/02008 |
| 2020/0239351 A1* | 7/2020 | Bhatia | .................... | B32B 17/10 |
| | | | | 428/339 |
| 2020/0251082 A1* | 8/2020 | Smith | ................. | B60R 13/0853 |
| | | | | 296/198 |

OTHER PUBLICATIONS

Windshield Experts, "Acoustic windshield helps in noise reduction," Marketing Materials from Windshield Experts, 2 pages (2016) (last downloaded Oct. 11, 2018).

* cited by examiner

GLASS AND EXTERIOR PANEL DESIGN FOR LOW NOISE TRANSMISSION

TECHNICAL FIELD

The present disclosure generally relates to minimizing exterior air turbulence noise and, more particularly, to designs for tailoring exterior noise transmitted into a vehicle due to the turbulence.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Acoustic laminated glass provides high damping in order to reduce transmitted noise from acoustic sources. Its primary benefit is at and near the acoustic coincidence frequency, which is typically in the 2,000-3,000 Hz range for automotive glass. Pressure due to air turbulence, which is vastly different from a purely acoustic source, generally travels at a much lower wave speed and corresponds to a much lower turbulent coincidence frequency, typically in the 30-200 Hz range for automotive glass and body panels. At and above this frequency, air turbulence can couple with vibrational resonances of the glass, or other exterior body panels, resulting in the transmission of noises into the vehicle. While it is often desirable to have a quiet interior cabin of a vehicle, this cannot be accomplished using common acoustic laminated glass when the vehicle is moving at an increased speed, subject to various turbulent pressure airflows.

Accordingly, it would be desirable to provide improved, cost effective glass and body panel designs and methods of lowering noise transmission into an interior compartment of a vehicle.

SUMMARY

This section provides a general summary of the disclosure, and is not a comprehensive disclosure of its full scope or all of its features.

In various aspects, the present teachings provide a noise insulating support panel for a structural assembly. The support panel includes a base substrate component and at least one localized stiffening reinforcement feature. The reinforcement feature may extend across the base substrate component in a length direction that is aligned with, i.e., substantially parallel to, or substantially perpendicular to, a direction of airflow exhibiting turbulent pressure onto the base substrate component. The reinforcement feature cooperates with the base substrate component to minimize energy transmission through the base substrate component. In aspects where the base substrate component is laminated glass, the reinforcement feature is located within an interlayer disposed between first and second glass layers. The interlayer may include a first region including polyvinyl butyral having a first stiffness, and a second region including polyvinyl butyral having a second stiffness, lower than the first stiffness. In aspects where the base substrate component is a body panel, the reinforcement feature may be a rib member.

In other aspects, the present teachings provide a glass laminate component with enhanced noise insulating features. The glass laminate component may include a first glass layer and a second glass layer. At least one interlayer is provided, disposed between the first glass layer and the second glass layer. A portion of the interlayer includes a localized stiffening reinforcement extending in a length direction that is aligned with, i.e. substantially parallel to, or substantially perpendicular to, a direction of airflow exhibiting turbulent pressure onto one of the first and second glass layers. In various aspects, the localized stiffening reinforcement includes a reinforcing polymer or resin, such as polyvinyl butyral, having a higher glass transition temperature than a glass transition temperature of a remainder of the interlayer. In various aspects, the interlayer defines a pattern having a plurality of rows, each row alternating in a level of reinforcement between a high stiffness and a low stiffness relative to one another.

In still other aspects, the present teachings provide a noise insulating automotive glass laminate component. The noise insulating automotive glass laminate component includes a first glass layer, a second glass layer, and an interlayer disposed between the first glass layer and the second glass layer. The interlayer includes a reinforcing polymer or resin defining a pattern having a plurality of rows extending in a length direction that is aligned with, i.e. substantially parallel to, or substantially perpendicular to, a direction of airflow exhibiting turbulent pressure onto one of the first and second glass layers. Each row may alternate in a level of reinforcement between a high stiffness and a low stiffness relative to one another. In various aspects, the glass laminate component defines an outer perimeter and further includes a stiffening feature, such as a frame component, disposed adjacent to at least a portion of the outer perimeter.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

Figure 1:
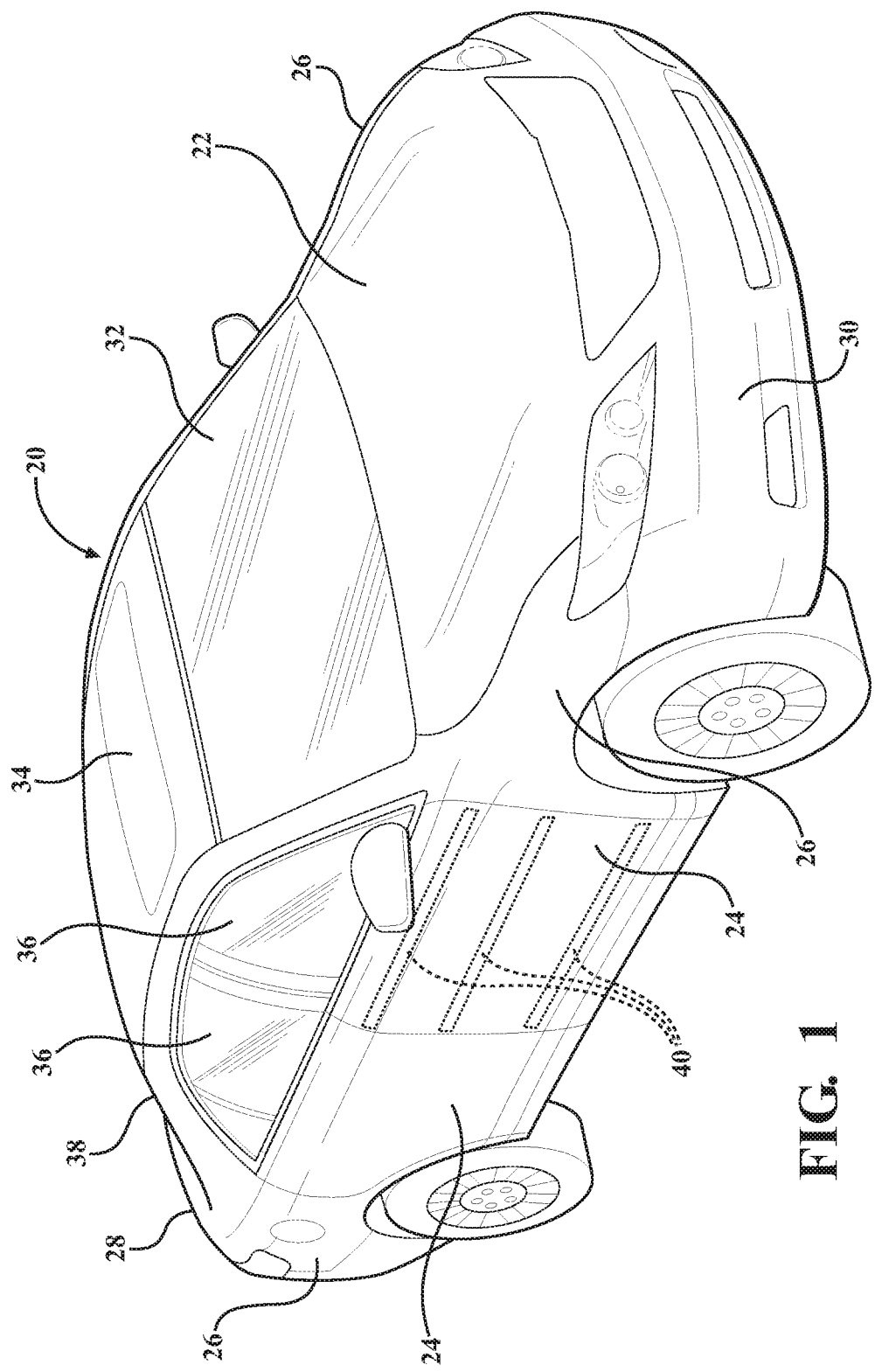
FIG. 1 illustrates a perspective side plan view of an exemplary vehicle that may include body panels and laminated glass components with stiffening features and/or reinforcement features according to various aspects of the present technology.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present technology generally teaches designs and configurations for exterior body panel/skin components and glass components that are strategically reinforced in order to make structural resonances less sensitive to turbulent pressure excitation in wind noise caused by the movement of air with respect to a vehicle or structural assembly. The technology includes altering the mode shape of the resonances so that they do not couple well with the turbulent pressure above the turbulent coincidence frequency. This reduces sensitivity to turbulent pressure on the exterior of a vehicle or other support structure, resulting in lower noise transmitted into an interior compartment of the vehicle or support structure. For example, the mode shape is significantly affected such that the wave number in the direction of airflow is significantly reduced, thus, making the glass or exterior body panel component less sensitive to turbulent pressure. In various aspects, a goal of the present technology is to lower the wavenumber, making the wavelength longer, of a resonant mode in the direction of airflow, while not shifting the resonant frequency substantially. Another goal is to reduce panel resonant mode vibration at leading and trailing edges of the panel (relative to airflow direction). In the example of a moving vehicle, this leads to decreased noise in a passenger cabin when the vehicle is moving at higher driving speeds.

In various aspects, a noise insulating support panel is provided for a structural assembly. The support panel includes a base substrate component and at least one localized stiffening reinforcement feature. The reinforcement feature generally extends across the base substrate component in a length direction aligned with, i.e., substantially parallel to, a direction of airflow exhibiting turbulent pressure onto the base substrate component. In certain instances, the reinforcement feature may be substantially perpendicular to the direction of airflow. The reinforcement feature can be integral with the base substrate component, or it can be a separate component joined to the base substrate component. The reinforcement feature generally cooperates with the base substrate component to minimize energy transmission through the base substrate component.

In aspects where the base substrate component is a laminated glass, the reinforcement feature may be integrated within the glass, for example, located within an interlayer disposed between glass layers. As will be discussed in more detail below, the interlayer may include a first region including a reinforcing polymer/resin, such as polyvinyl butyral, having a first stiffness, and a second region including a reinforcing polymer/resin having a second stiffness, lower than the first stiffness. In aspects where the base substrate component is a body panel, or exterior shell/skin component, the reinforcement feature may be a stiffening rib member. One or more stiffening rib members may also be used with a laminated glass component, although it may not be as desirable for certain aesthetic purposes.

While the descriptions of the present technology herein may specifically refer to moving vehicles, and passenger automobiles in particular, the teachings are equally applicable to other types of vehicles, in addition to stationary structures. As used herein, the term "vehicle" is referred to in its broadest sense, and can include any type of vehicle that would benefit from noise reduction in an interior compartment at high speeds. In various aspects, the generic term "vehicle" refers a variety of differently configured passenger and commercial vehicles, for travel either on paved government streets/roads as well as for off-road use, such as an all-terrain vehicle. A non-limiting listing of types of vehicles includes a passenger car, truck, motorcycle, off-road vehicle, bus, boat/vessel/ship, submarine, airplane, helicopter, lawn mower, recreational vehicle, amusement park vehicle, farm vehicle, construction vehicle, tram, golf cart, train, or trolley, etc. The present technology is not limited to vehicles, and is also applicable for use with stationary structures, for example, windows in a house, commercial building, highrise building, light house, or similar type of substantially motionless structure that may be susceptible to high winds. In other words, for example, it is also useful where it would be desirable to reduce wind noise in an interior location.

FIG. 1 generally illustrates a perspective side plan view of an exemplary passenger vehicle 20 that is provided with various types of base substrate components, such as body panels and glass components, according to various aspects of the present technology. By way of non-limiting examples, body panels may include panels of exterior surfaces such as a hood 22, a door panel (front or rear) 24, a side/quarter panel (front or rear) 26, a trunk 28, and in certain aspects, even a bumper (front or rear) 30. Such body panels may be made of one or more layers of material, with suitable materials including metals, plastics, composites, and combinations thereof. Non-limiting examples of glass components may include a windshield 32, a sunroof 34, a passenger window (front or rear) 36, a rear window 38, etc. While most of the glass components useful herein are laminated glass components, it is also envisioned that certain non-laminated glass components may also be used, depending on the composition, design, and end use.

With respect to a vehicle, the present technology provides localized mass redistribution and/or localized stiffening of a body panel or a glass component in the direction of airflow in order to lower the wavenumber (radians/m) of the body/glass resonant modes in that direction, or perpendicular to airflow in order to reduce panel vibration at leading and trailing edges of the panel. With a tailored mass distribution, or localized stiffening, designs using the present technology provide a larger separation between the wavenumber of the excitation, for example, the turbulent pressure, and the responding system, for example, the glass or body panel resonance. This results in less efficient coupling of the turbulent pressure to the glass/body panel resonances, so less noise is transmitted into the vehicle interior.

For body panels, this can be done by implementing the use of stiffening rib members, generally shown by reference number 40 of FIG. 1, coupled to the body panels at strategic locations. In various aspects, the stiffening rib members 40 are generally aligned longitudinally with a direction of turbulent airflow that is adjacent the body panel during high speed operations of the vehicle in order to focus a mass redistribution or localized stiffness discontinuity. Additionally, concentrating and/or adding mass or stiffness at one or more strategic locations, typically at the leading or trailing edges of the panel, relative to the airflow direction, can reduce resonant mode vibration at these edges. Such a stiffening rib member 40 may be formed with the respective body panel as an integral component, for example as a concentrated location of mass or stiffness and/or a region provided with a tapered thickness. In other aspects, the stiffening rib member 40 may be a separate component joined or fastened to the body panel using an adhesive or suitable mechanical fastening. As a separate component, the stiffening rib member 40 may be translucent or colored to match the body panel. The composition of the stiffening rib member 40 may be the same as the body panel itself, or it may be a different material. Generally, the stiffening rib member 40 is located on an interior side of the body panel, such that it is not visible from an exterior of the vehicle or structural assembly.

Figure 2:
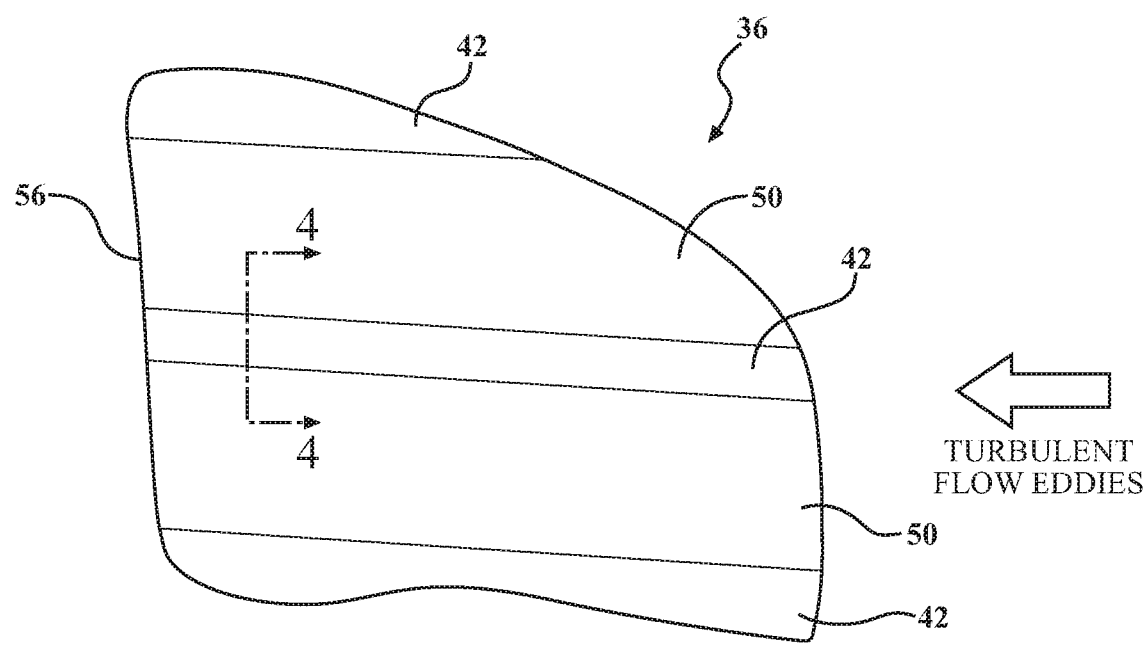
FIG. 2 is a side plan view of an exemplary front passenger window including a plurality of localized stiffening reinforcement features extending in a direction of airflow exhibiting turbulent pressure on the window.

A window can be a major source of aerodynamic noise in an interior of a vehicle. In various aspects, the stiffening of glass, and automotive glass in particular, can be accomplished by using a laminated glass construction that includes an interlayer disposed between two layers of glass and designed with one or more strategically located stiffening reinforcement features. FIG. 2 is side plan view of an exemplary front passenger window 36 including a plurality of localized stiffening reinforcement features 42 extending in a direction of airflow exhibiting turbulent flow eddies and pressure against the window.

Figure 3:
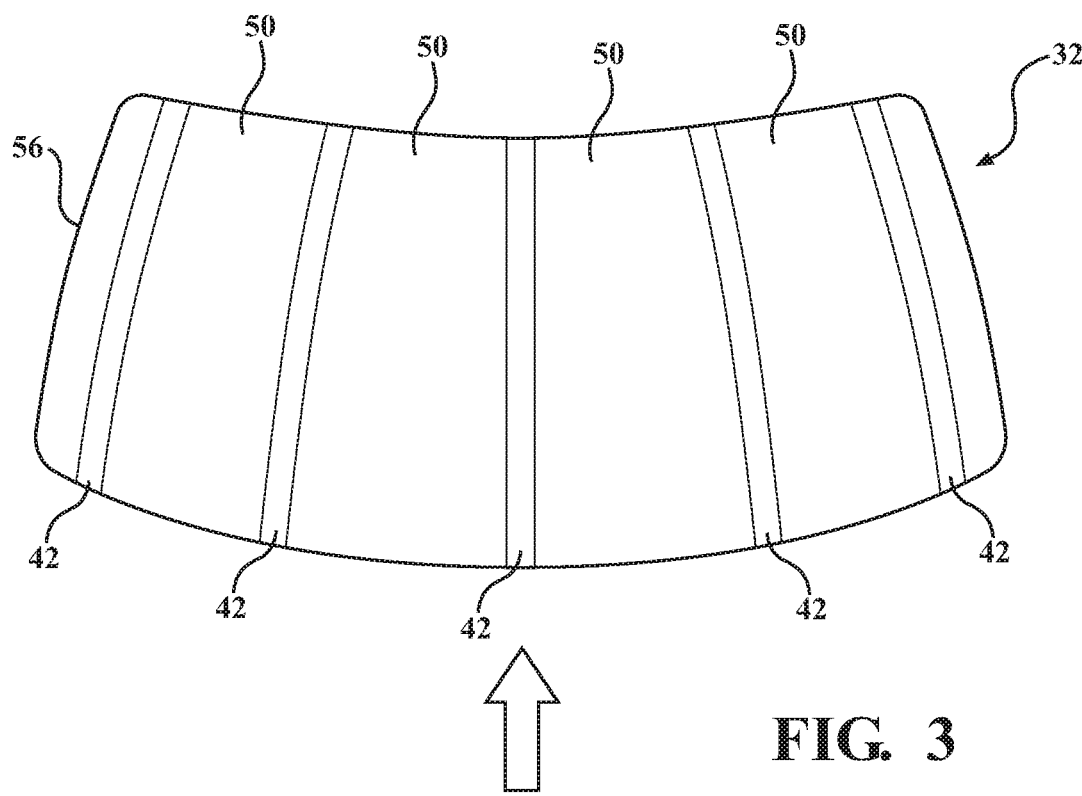
FIG. 3 is a top plan view of an exemplary vehicle windshield including a plurality of localized stiffening reinforcement features extending in a direction of an airflow exhibiting turbulent pressure on the windshield.

A windshield can also be a major source of aerodynamic noise. A reduction in noise originating from the windshield may be particularly important with respect to the use of microphones that may be positioned adjacent a driver or front passenger of a vehicle. For example, microphones strategically placed within a rear view mirror coupled to the windshield, or at a location along the dashboard, may greatly benefit from a reduction of noise originating from the windshield. FIG. 3 is top plan view of an exemplary vehicle windshield 32 including a plurality of localized stiffening reinforcement features 42 extending in a direction of an airflow exhibiting turbulent pressure on the windshield.

Figure 4:
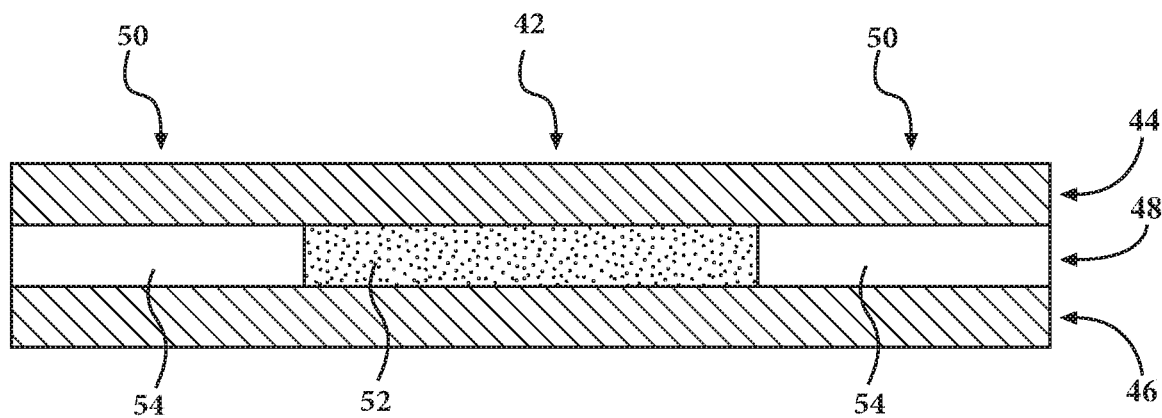
FIG. 4 is a partial cross-sectional view of the window and a localized stiffening reinforcement feature taken along the line 4-4 of FIG. 2.

FIG. 4 is a partial cross-sectional view of the window 36 with the localized stiffening reinforcement feature 42 taken along the line 4-4 of FIG. 2. As shown in FIG. 4, the laminated glass construction includes a first layer 44, a second layer 46, and an interlayer 48 between the first layer 44 and the second layer 46. In various aspects, the interlayer 48 may be provided with a design or pattern that includes a plurality of rows (or columns, depending on the orientation), with each row or region alternating in a level of strength/reinforcement, for example, alternating between a row exhibiting a high stiffness and a row exhibiting a low stiffness, relative to one another. This can be seen in FIGS. 2 and 3, alternating between regions 50 having a low (or regular) stiffness, and the regions having localized stiffening reinforcement features 42. It should be understood that the number, size, and precise location of the localized stiffening reinforcement features 42 may vary depending upon the design requirements, and the figures presented herein are exemplary in nature, thus not intended to provide actual scaled dimensions or the like.

Typically, the interlayer 48 of laminated glass serves a transparent barrier layer that joins the glass layers, 44, 46 together. In various aspects, one or more reinforcing polymer or resin can be located within the interlayer 48 to provide the localized stiffening reinforcement feature, particularly where is it provided with a higher stiffness than a remainder of the glass component. As shown in FIG. 4, the interlayer 48 may be provided with a first region 52 with a first reinforcing polymer/resin exhibiting a first stiffness, and a second region 54 with a second reinforcing polymer/resin, or other composition, exhibiting a second stiffness that is lower than the first stiffness. In various aspects, certain regions of the interlayer 48 may be provided with a different number of layers, different number of regions, and/or a different thickness. In various aspects, the glass laminate component can be provided with a first interlayer and a second interlayer, wherein each interlayer defines a pattern comprising a plurality of regions or rows of a stiffening reinforcing polymer. For example, each region or row could be provided alternating in a level of reinforcement between a high stiffness and a low stiffness relative to one another. In certain aspects, regions or rows of the first interlayer exhibiting the high stiffness may be located adjacent regions or rows of the second interlayer exhibiting the low stiffness.

In various aspects, the reinforcing polymer/resin may include other components, such as plasticizers and/or other additives, and may ultimately formed into a polymeric sheet or layer. As used herein, the term "interlayer" may refer to a single or multiple layered polymer sheet suitable for use with at least one rigid substrate to form a multiple layered component, or a component having multiple regions of different stiffness or strength. The terms "single-sheet" interlayer and "monolithic" interlayer refer to interlayers formed of one single resin sheet, while the terms "multiple layer" and "multilayer" interlayer refer to interlayers having two or more resin sheets coextruded, laminated, or otherwise coupled to one another. The resin compositions, layers, and interlayer(s) described herein may include one or more thermoplastic polymers formed according to various suitable methods. Non-limiting examples of suitable thermoplastic polymers can include, but are not limited to, polyvinyl acetal resins such as polyvinyl butyral (PVB), polyurethanes (PU), poly(ethylene-co-vinyl) acetates (EVA), polyvinyl chlorides (PVC), poly(vinylchloride-co-methacrylate), polyethylenes, polyolefins, ethylene acrylate ester copolymers, poly(ethylene-co-butyl acrylate), poly(methyl methacrylate), polycarbonate, silicone elastomers, epoxy resins, and acid copolymers such as ethylene/carboxylic acid copoloymers and ionomers thereof, derived from any of the previously-listed polymers, and combinations thereof.

In various aspects, the interlayer 48 includes polyvinyl butyral (PVB) that alternates in adjacent regions 52, 54 between a first PVB with a low stiffness, and second PVB having a high stiffness relative to the stiffness exhibited by the first PVB. In certain aspects, the stiffness can be controlled by the amount or specific type/composition of PVB that is present. In other aspects, the stiffness can be controlled using known additives or other components with the resin to adjust the stiffness in a suitable manner. In various aspects, the different areas, or regions 52, 54, of the interlayer 48 that provide the different levels of stiffness, or reinforcement, may be provided with materials having a varying glass transition temperature, $T_g$. For example, in certain aspects, the interlayer can include a plurality of different polymer or resin formulations, which may include PVB, each exhibiting different glass transition temperatures, and thus a different stiffness. In various aspects, the glass transition temperature of the different regions of the interlayer may vary by about 10° C., by about 20° C., by about 30° C., by about 40° C., by about 50° C., and even by about 60° C. In various aspects, the different areas, or regions 52, 54, of the interlayer 48 that provide the different levels of stiffness, or reinforcement, may be provided with materials having different modulus of elasticity. For example, in certain aspects, an increase in the interlayer modulus of elasticity by a factor of about 100 can increase the overall localized stiffness of the glass panel by a factor of approximately 8 thereby reducing the vibration wavenumber by a factor of approximately 3. Thus, in certain aspects, the localized stiffening reinforcement may include a reinforcing polymer or resin having a higher modulus of elasticity than a modulus of elasticity of a remainder of the interlayer.

Figure 5:
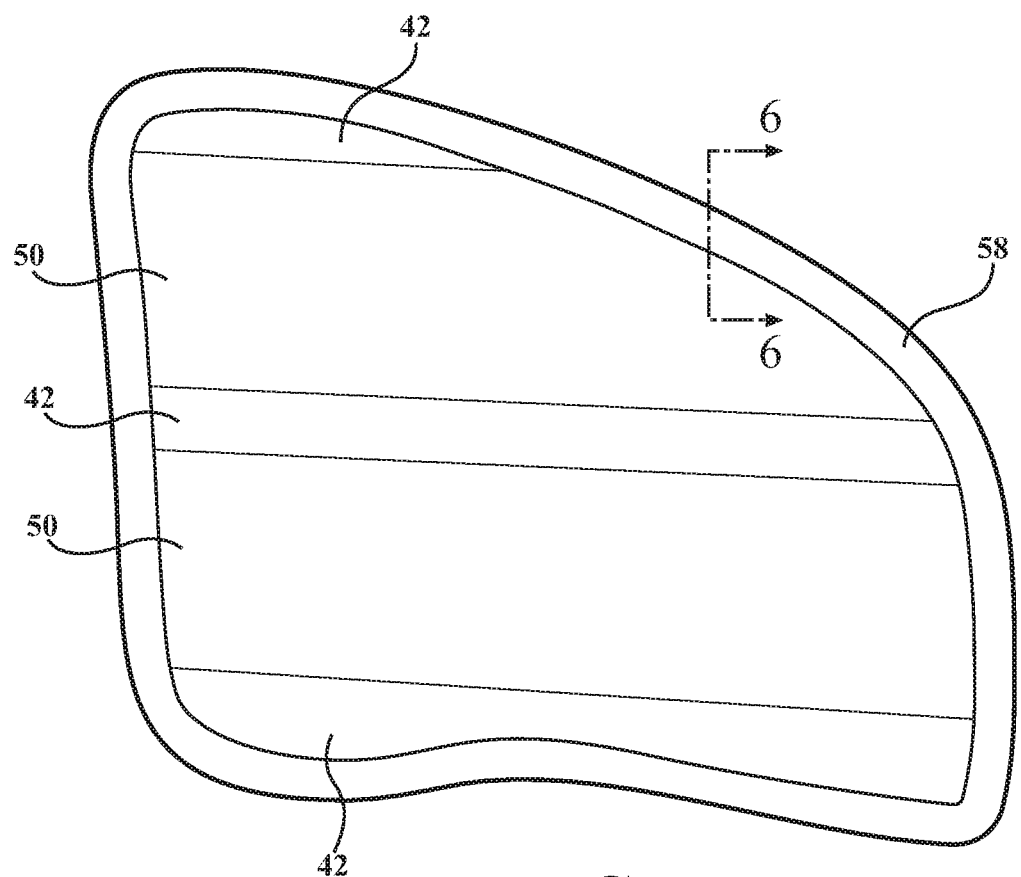
FIG. 5 is a side plan view of the window of FIG. 2, further including a stiffening feature presented as a frame extending around a perimeter of the window.

The body panels and glass laminate components can also be provided with localized reinforcement by providing selective stiffening features directed to stiffening of the edges of the body panel or glass. In certain examples, this is accomplished with a frame or similar type of support structure disposed adjacent to at least a portion of an outer perimeter 56. FIG. 5 is a side plan view of the window 36 of FIG. 2, further including a stiffening feature presented as a frame 58 extending around a perimeter 56 of the window 36. While illustrated in FIG. 5 as a stiffening feature extending continuously around the perimeter 56, in various aspects, the stiffening feature can be discontinuous, and different edges or regions can be provided with different types of perimeter stiffening features.

Figure 6A:
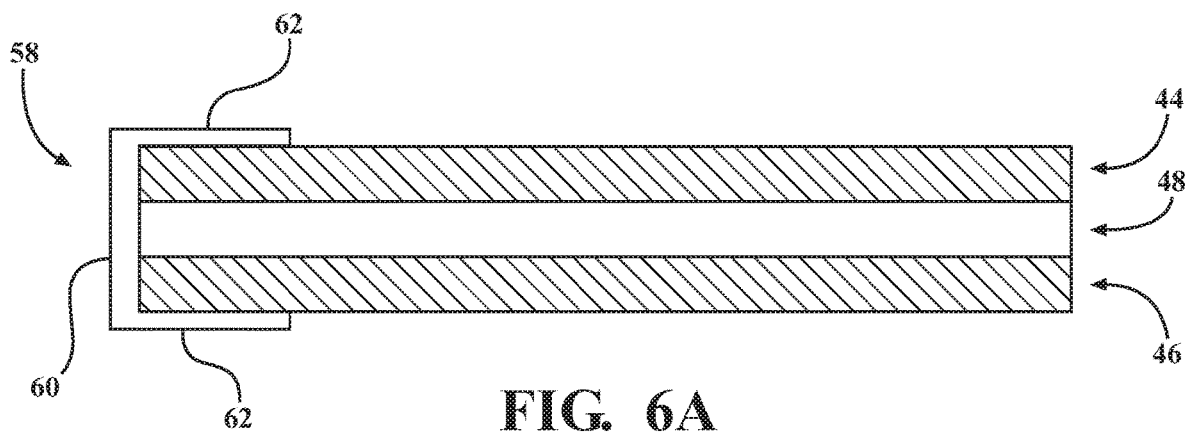
FIG. 6A is a partial cross-sectional view of the window and a first stiffening feature taken along the line 6-6 of FIG. 5.

FIG. 6A is a partial cross-sectional view of the window 36 taken along the line 6-6 of FIG. 5 illustrating a first type of stiffening feature that may be coupled, press-fit or otherwise secured to the perimeter or edge region(s) of the window 36 using an adhesive or mechanical type of fastener. As a non-limiting example, FIG. 6A provides a substantially U-shaped frame 58 that includes a base portion 60 and two sidewall portions 62 extending from the base portion 60 along an edge of the glass.

Figure 6B:
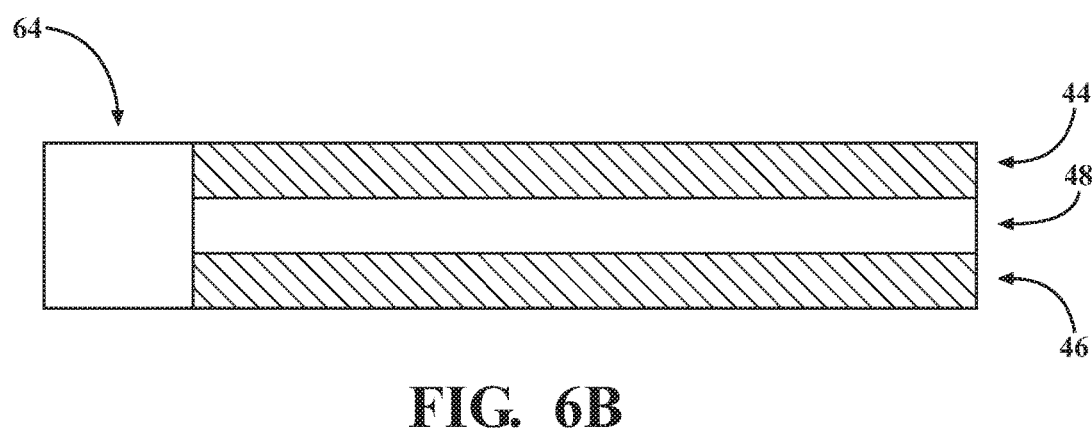
FIG. 6B is a partial cross-sectional view of the window and a second stiffening feature taken along the line 6-6 of FIG. 5.
Figure 6C:
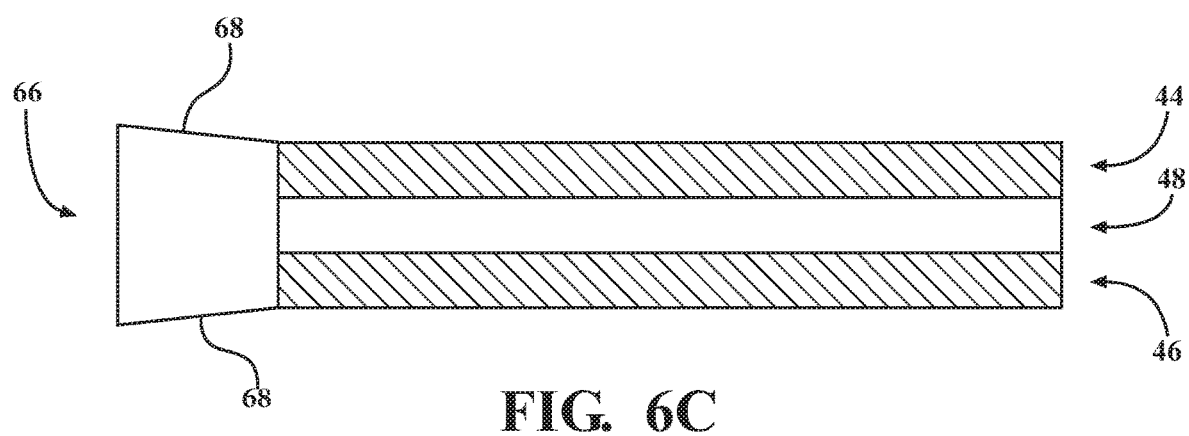
FIG. 6C is a partial cross-sectional view of the window and a third stiffening feature taken along the line 6-6 of FIG. 5.

FIG. 6B is a partial cross-sectional view of the window 36 with a second type of stiffening feature. In this aspect, the perimeter, or portion thereof, can be provided with a localized region 64 of a concentration of mass that has a different strength or stiffness than a remainder of the glass component. The composition of this region 64 can be substantially the same as the base substrate, or can include a different composition or material. FIG. 6C is a partial cross-sectional view of the window and a third stiffening feature 66 provided with tapered edges 68. For example, the tapered edges 68 may increase the mass of the stiffening feature 66, attributing to added strength and potential for noise reduction.

The present technology additionally allows for the shaping and bending of the glass laminate component in order for manufacturers to use glass at strategic locations and with complex shapes and bends. For example, laminated glass made in accordance with the present teaching may be bent and shaped for certain windshield and window designs. It is also contemplated that the glass can be colored and/or tinted to achieve a desired design characteristic.

As should be understood, automotive applications of the laminated glass components made according to the present teachings should have an appropriate clarity parameter, which may be represented as a haze value or percentage, indicating a quantification of light that is scattered by a particular sample, in contrast to the incident light. Other desirable optical properties include a low mottle value, which is a measure of texture or optical distortion usually where two compositions meet. For example, mottle is a form of optical distortion or visual defect appearing as uneven spots or texture in a final structure. Mottle is generally caused by small-scale surface variations at the interfaces between the soft and stiff layers wherein the individual layers have different refractive indices.

Figure 7A:
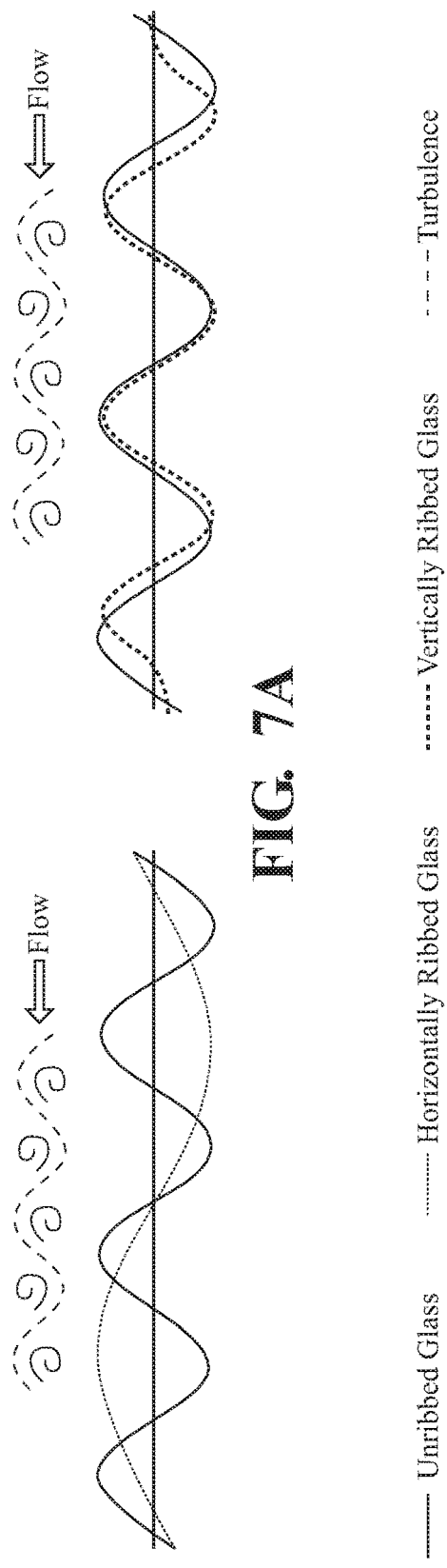
FIG. 7A is a pair of graphs illustrating the spatial pattern of vibration mode shapes and turbulent flow eddies for unribbed glass, horizontally ribbed glass (ribs substantially parallel to airflow direction), and vertically ribbed glass (ribs substantially perpendicular to airflow direction)
Figure 7B:
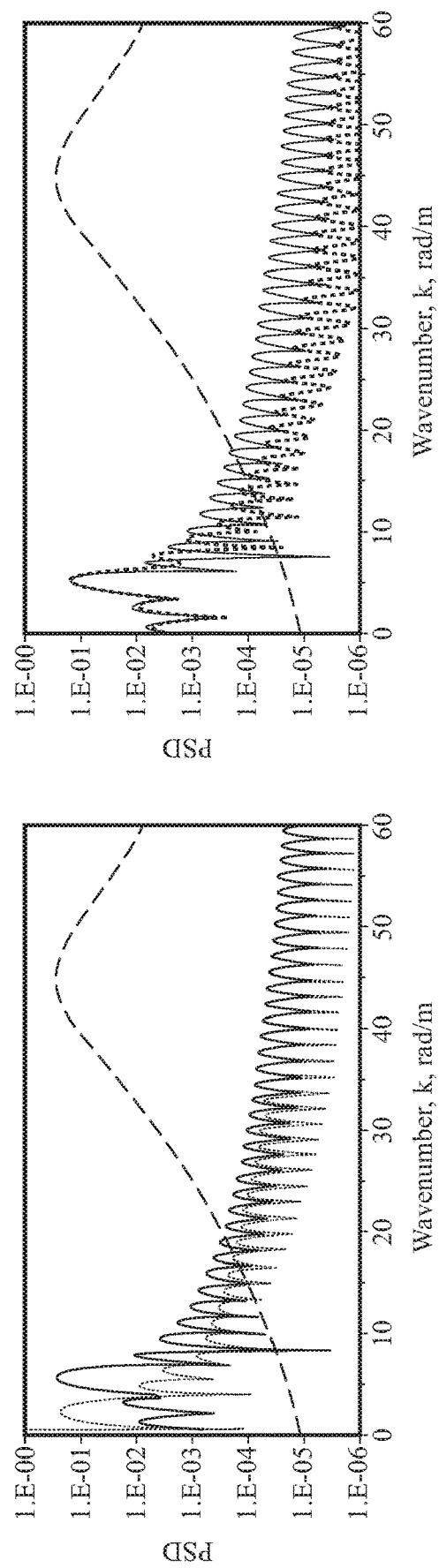
FIG. 7B illustrates plots of wavenumber spectra of vibration mode shapes around 500 Hz and a turbulent pressure at 120 kph.

In theory, the alignment and configuration of the various localized stiffening reinforcement features will affect the response to wind noise differently. For example, the designs with the localized stiffening reinforcement features extending in a direction of the turbulent airflow should bias the mode shapes of the glass vibration to be longer in the flow direction, and less sensitive to the turbulent eddies, which are smaller in size. In contrast, any designs with the localized stiffening reinforcement features extending in a direction perpendicular to the turbulent airflow should bias the mode shapes of the glass vibrations to have lower amplitude at the leading and trailing edges, relative to the airflow, which also reduces vibration. FIG. 7A is a pair of graphs illustrating the spatial pattern of vibration mode shapes and turbulent flow eddies for unaltered glass (no stiffening features), horizontally ribbed glass (ribs in the airflow direction), and vertically ribbed glass (ribs perpendicular to airflow). The graphs illustrate how the stiffening features modify the glass vibration mode shapes relative to the turbulent eddies. FIG. 7B illustrates plots of wavenumber spectra of vibration mode shapes around 500 Hz and a turbulent pressure at 120 kph. These results provide the wavenumber (spatial frequency) domain. Generally, the wavenumber spectrum is representative of the Fourier Transform of the spatial mode shape function, just as the frequency spectrum is the Fourier Transform of a time signal. The wavenumber $k=2\pi/\lambda$, where $\lambda$ is the spatial wavelength. The vibration response of the glass (and the transmitted sound) is proportional to the product of the turbulent pressure spectrum and the vibration spectrum. In general, there are two relatively equal contributions to this product: the mode shape peak times the low wavenumber level of the turbulence spectrum; and the turbulence peak times the side band response of the glass. The horizontal ribs (in the direction of airflow) lower the wavenumber of the mode shape peak to a region of lower turbulent excitation. The vertical ribs (perpendicular to the airflow direction) lower the side band levels of the glass vibration mode (due to the suppression of the edge vibration levels).

Figure 8:
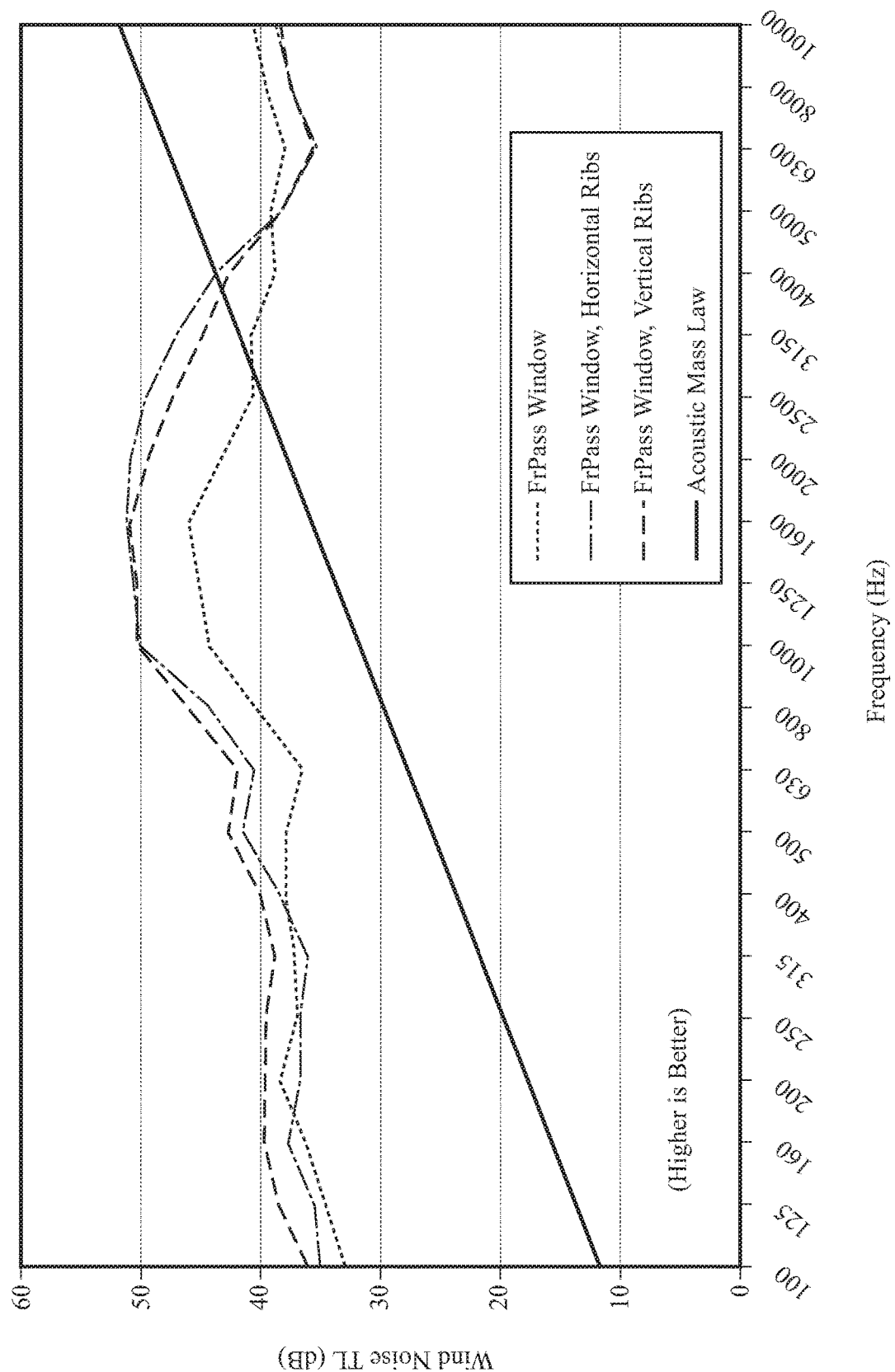
FIG. 8 provides a plot of turbulent TL versus frequency for a front passenger window, a front passenger window with horizontal ribs, and a front passenger window with vertical ribs.

FIG. 8 provides a plot of turbulent pressure TL versus frequency for a front passenger window (no stiffening features), a front passenger window with horizontal rib stiffening features (ribs in the airflow direction), and a front passenger window with vertical rib stiffening features (ribs perpendicular to airflow). The acoustic intensity transmitted through the unmodified glass (4 mm thick tempered monolithic glass) was measured for wind speeds from 100-150 kph. The turbulent pressure levels in the flow were also measured and the ratio to the acoustic intensity gives the turbulent wind noise transmission loss (TL) in dB. FIG. 8 shows the average increase in TL (reduction in decibel level of transmitted sound) for the two rib configurations. The vertical ribs provided a 3-5 dB increase in the wind noise TL from 100-4000 Hz, while the horizontal ribs provided a similar increase from 500-4000 Hz.

The foregoing description is provided for purposes of illustration and description and is in no way intended to limit the disclosure, its application, or uses. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range, including the endpoints.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

What is claimed is:

1. A noise insulating support panel for a structural assembly, the noise insulating support panel comprising:
   a base substrate component;
   at least one localized stiffening reinforcement feature extending across the base substrate component in a length direction that is either aligned with a direction of airflow exhibiting turbulent pressure onto the base substrate component, or aligned perpendicular to the airflow,
   wherein the localized stiffening reinforcement feature comprises one or both of a localized concentration of mass and a region with a tapered thickness, and cooperates with the base substrate component to minimize energy transmission through the base substrate component.

2. The noise insulating support panel according to claim 1, wherein the base substrate component comprises laminated glass, and the localized stiffening reinforcement feature is located within an interlayer disposed between first and second glass layers, the interlayer including a first region comprising polyvinyl butyral having a first stiffness and a second region comprising polyvinyl butyral having a second stiffness, lower than the first stiffness.

3. The noise insulating support panel according to claim 2, wherein the interlayer defines a pattern comprising a plurality of rows, each row alternating in a level of reinforcement between a high stiffness and a low stiffness relative to one another.

4. The noise insulating support panel according to claim 1, wherein the base substrate component comprises a body panel and the structural assembly comprises a moving vehicle.

5. The noise insulating support panel according to claim 4, wherein the localized stiffening reinforcement feature comprises a plurality of extending rib members, each being aligned with the direction of airflow exhibiting turbulent pressure onto the base substrate component.

6. The noise insulating support panel according to claim 1, defining an outer perimeter and further comprising a stiffening feature disposed adjacent to at least a portion of the outer perimeter.

7. The noise insulating support panel according to claim 6, wherein the stiffening feature comprises a frame continuously extending around the outer perimeter.

8. The noise insulating support panel according to claim 1, wherein the structural assembly is a moving vehicle selected from the group consisting of an automobile, an aircraft, a train, a watercraft, and a submarine, and the base substrate component comprises one of a laminated glass and a body panel.

9. A glass laminate component with enhanced noise insulating features, the glass laminate component comprising:
   a first glass layer;
   a second glass layer; and
   at least one interlayer disposed between the first glass layer and the second glass layer, a portion of the interlayer comprising a localized stiffening reinforcement extending in a length direction that is aligned with a direction of airflow exhibiting turbulent pressure onto one of the first and second glass layers,
   wherein the interlayer defines a pattern comprising a plurality of rows, each row alternating in a level of reinforcement between a high stiffness and a low stiffness relative to one another.

10. The glass laminate component according to claim 9, wherein the localized stiffening reinforcement comprises a reinforcing polymer or resin having a higher modulus of elasticity than a modulus of elasticity of a remainder of the interlayer.

11. The glass laminate component according to claim 10, wherein the reinforcing polymer comprises polyvinyl butyral.

12. The glass laminate component according to claim 9, defining an outer perimeter and further comprising a stiffening feature disposed adjacent to at least a portion of the outer perimeter.

13. The glass laminate component according to claim 12, wherein the stiffening feature comprises a frame continuously extending around the outer perimeter.

14. The glass laminate component according to claim 12, wherein the stiffening feature comprises at least one of a localized concentration of mass and a tapered thickness.

15. The glass laminate component according to claim 9, comprising a first interlayer and a second interlayer, wherein each interlayer defines a pattern comprising a plurality of rows of a stiffening reinforcing polymer, each row alternating in a level of reinforcement between a high stiffness and a low stiffness relative to one another.

16. A noise insulating automotive glass laminate component, comprising:
   a first glass layer;
   a second glass layer; and
   an interlayer disposed between the first glass layer and the second glass layer, the interlayer comprising a reinforcing polymer or resin aligned defining a pattern having a plurality of rows extending in a length direction that is aligned with a direction of airflow exhibiting turbulent pressure onto one of the first and second glass layers, each row alternating in a level of reinforcement between a high stiffness and a low stiffness relative to one another.

17. The noise insulating automotive glass laminate component according to claim 16, defining an outer perimeter and further comprising a stiffening feature disposed adjacent to at least a portion of the outer perimeter.

18. The noise insulating automotive glass laminate component according to claim 16, wherein alternating rows of the interlayer include different compositions comprising polyvinyl butyral, each composition exhibiting a different stiffness.

19. A noise insulating glass component, comprising:
   a glass substrate; and
   at least one localized stiffening reinforcement feature extending across the glass substrate in a length direction,
   wherein the localized stiffening reinforcement feature comprises one or both of a localized concentration of mass and a region with a tapered thickness, and cooperates with the glass substrate to minimize energy transmission through the glass substrate when subjected to airflow exhibiting turbulent pressure.

* * * * *